Nov. 10, 1942.  O. DORSCHNER  2,301,687
RECOVERY AND DETOXICATION OF CITY GASES
Filed Sept. 5, 1939
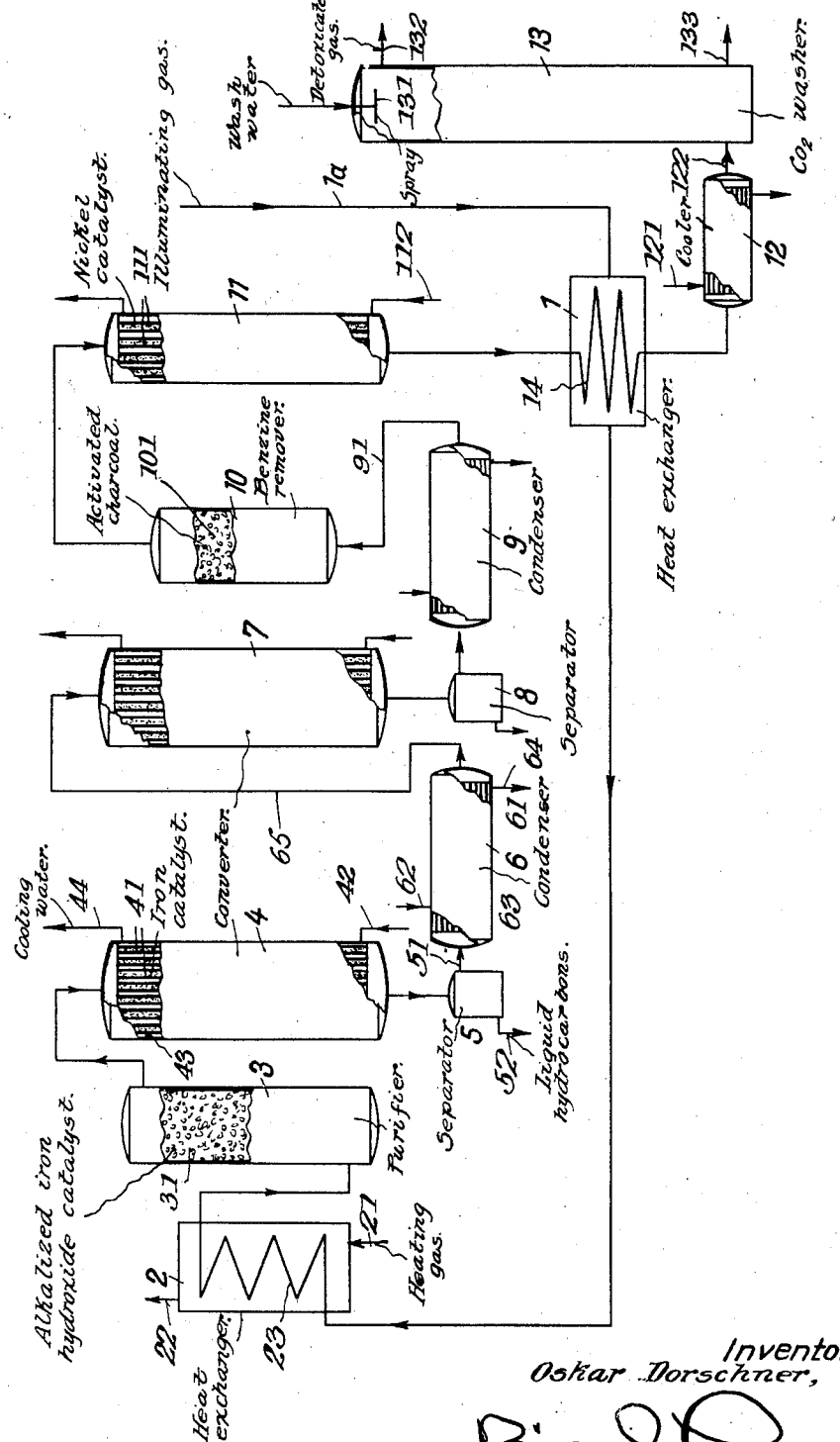
Inventor:
Oskar Dorschner,
Bailey & Carson
Attorneys Patented Nov. 10, 1942

2,301,687

UNITED STATES PATENT OFFICE 2,301,687

RECOVERY AND DETOXICATION OF CITY GASES

Oskar Dorschner, Frankfort-on-the-Main, Germany, assignor to American Lurgi Corporation, New York, N. Y., a corporation of New York Application September 5, 1939, Serial No. 293,487
In Germany September 13, 1938

7 Claims.  (Cl. 260—449)

The invention relates to a process for the recovery and for detoxicating illuminating gas, and particularly to a process for detoxicating such gas while maintaining a high combustion value thereof.

The primary object of the invention is to provide a process for detoxicating illuminating gases containing carbon monoxide and hydrogen, in which the carbon monoxide is converted into non-toxic compounds.

A further object of the invention is to provide a process of this type in which the conversion of carbon monoxide is carried out in such a manner as to cause only a small reduction in the hydrogen content of the gas.

Still another object of the invention is to provide a process in which the thermal value of the final gas is substantially equal to that of the gas before it is subjected to the treatment.

Processes at present known for the detoxication of illuminating gas are based either on the oxidation of carbon monoxide with steam to form carbon dioxide, according to the equation:

$$CO+H_2O=CO_2+H_2$$

or on the reaction with hydrogen to form methane according to the equation:

$$CO+3H_2=CH_4+H_2O$$

A combination of these two procedures is also known.

The latter procedure has the very great disadvantage that a very substantial proportion of the hydrogen content is required for the formation of the methane. This reduces the combustible properties of the gas to such an extent that it cannot be directly used as illuminating gas. Furthermore, the high methane content resulting is a considerable disadvantage.

According to the present invention, a process is used in which the carbon monoxide is reduced by means of catalysts capable of causing the formation of liquid hydrocarbons and/or organic compounds which contain oxygen, and which in the reaction do not consume, for reduction of the carbon monoxide, more than two atoms of hydrogen for each molecule of carbon monoxide, and preferably a considerably less number of atoms of hydrogen than molecules of carbon monoxide.

The suggestion has been made that the residual gas from the Fischer-Tropsch benzine synthesis (using catalysts of cobalt or nickel) should be used as illuminating gas, after it has been subjected to detoxication by the second procedure mentioned above. It has been found, however, impossible to utilize this residual gas as an illuminating gas. The synthesis of this gas occurs approximately according to the following formula:

$$xCO+2xH_2=(CH_2)_x+H_2O$$

The production of a detoxicated illuminating gas containing 2% or less of carbon monoxide is impossible in this manner without the use of substantially all of the hydrogen present in the gas.

The present invention involves the use of catalyst for the direct recovery of a detoxicated illuminating gas from a water gas, coke-oven gas or city gas which produce a reaction substantially according to the following formula:

$$x(2CO)+x(H_2)=(CH_2)_x+x(CO_2)$$

Such a catalyst causes the formation of liquid hydrocarbons and/or organic compounds which contain oxygen. In the conversion of equal quantities of carbon monoxide the consumption of hydrogen may be as low as one-fourth of that required with the usual reaction according to the Fischer-Tropsch synthesis. Since a volumetric contraction is combined with the conversion of the carbon monoxide, the small decrease in the quantity of hydrogen is substantially compensated for so that the volumetric percentage of hydrogen in the final gas is approximately the same. By this procedure, it is possible to produce an illuminating gas of substantially normal efficiency and thermal value which is detoxicated to any desired degree, for example to a content of less than 1% carbon monoxide.

The actual ratio of carbon monoxide to hydrogen taking part in the reaction, and thus the degree of carbon dioxide formation, is influenced by the ratio of carbon monoxide to hydrogen in the gas as well as by the catalyst used. For example, if a catalyst causes the reaction of 2 parts by volume of carbon monoxide to 1 part by volume of hydrogen in a gas in which the volumes of carbon monoxide is twice that of the hydrogen, the same catalyst will cause the reaction of only 1 to 1½ parts of carbon monoxide to 1 part of hydrogen in a gas containing 3 volumes of hydrogen to 1 of carbon monoxide. Variations in temperature may also have some effect on the reaction.

The present method causes the conversion in a single step of about 90% of the carbon monoxide present. By repeating the procedure, the conversion of the carbon monoxide can be carried to any desired degree. It is especially desirable, however, to remove the last traces only of carbon monoxide in the known manner by the use of nickel or cobalt catalysts which form methane or higher hydrocarbons. On the other hand, this residue may also be converted by treatment with steam in the presence of an iron oxide catalyst to convert the carbon monoxide into water.

The preferred catalysts according to the invention for producing liquid hydrocarbons are the iron-containing catalysts of the known type utilized for reducing carbon monoxide to liquid and solid organic substances (see for example "Gesammelte Abhandlungen zur Kenntnis der Kohle" 1925-1935). Also there may be used the types of iron-containing catalysts which at temperatures of 150° C. to 400° C. and under high pressure cause the synthesis of hydrocarbons and organic compounds containing oxygen from gas containing carbon monoxide and hydrogen.

The principal catalysts which are useful according to the process are those which contain metallic iron as the chief active constituent. These catalysts may also contain iron oxides and other iron compounds. Furthermore, they may contain activators such as the difficultly reducible oxides or other compounds of the elements of the third, fourth, sixth and seventh groups of the periodic system, such as the rare earths. Alkalies such as potassium hydroxide may also be added to the iron catalyst. The addition of activating metals, particularly those of the first and eighth groups of the periodic system, as for example copper, is sometimes helpful.

The catalyst is preferably produced by precipitation from solutions of metal salts upon vehicles such as kieselguhr. The kieselguhr is preferably used in etched condition, produced for example by boiling in alkali. The precipitations is preferably effected within a pH range of 7 to 11, the best results being obtained within a pH range of 9 to 10. The catalyst is preferably used in granular form.

During use, the catalyst is placed in a heat exchange mechanism provided with cooling means which are so regulated as to produce a uniform reaction temperature. Cooling may be accomplished by circulating water or any other suitable heat carrier. The reaction temperature is maintained between 150° C. and 400° C., preferably about 250° C.

In order to regulate the temperature accurately, the thickness of the body of catalyst between cooling elements should not exceed 25 millimeters, and may be as low as 10 millimeters.

However, instead of utilizing cooling elements, the gases may be recirculated in such a manner that some of the reaction heat is carried off thereby. Gases may also be used as the cooling medium.

Further objects and advantages of the invention and the operation thereof will be more fully understood from the following description particularly when taken in conjunction with the accompanying drawing which forms a part thereof.

The drawing shows an apparatus suitable for carrying out the invention.

As shown in the drawing, the illuminating gas which is to be detoxicated is introduced into a pipe 1a. From this it passes to a heat exchanger 1 and takes up heat from the gases leaving the apparatus. Thence it passes to a heat exchanger 2 which is supplied with hot gas through a pipe 21, this gas exhausting through pipe 22. Within the heat exchanger the gas flows through a coil 23 and thus takes up heat from the hot gas supplied by pipe 21. From the heat exchanger 2 the illuminating gas passes to a purifier 3 and passes upward therethrough in contact with a catalytic material 31, for example, an alkalized iron hydroxide catalyst. This catalyst removes organic sulfur from the illuminating gas in a well known manner. The gas then passes to a converter 4. This converter has therein a series of tubes 41 each filled with an iron catalyst, as for instance metallic iron deposited on kieselguhr. The illuminating gas enters at the top and passes through the tubes to the bottom of the converter 4, while cooling water introduced by pipe 42 into the space 43 around the tubes passes out at 44. By regulating the flow of cooling water the temperature within the tubes may be controlled.

From the bottom of the converter 4, the gas in which a large proportion of the carbon monoxide has now been converted passes into a separator 5. From this separator pipe 51 serves to lead off the gas, while any liquid hydrocarbons or organic oxygen containing compounds will settle to the bottom and may be withdrawn through pipe 52.

From the pipe 51 the gas passes into a condenser 6 where it passes through tubes 61. Cooling water is supplied by pipe 62 to the space 63 around the tubes, and escapes through a pipe 64. The gas with any condensible constituents removed then passes out through pipe 65.

In order to reduce the carbon monoxide content still further, the gas is now passed through a converter 7 similar to the converter 4, a separator 8 and a condenser 9. Leaving condenser 9 the gas passes through pipe 91 to a benzine remover 10 which contains activated charcoal 101. From this the gas passes to a converter 11, which is filled with nickel catalyst 111 instead of the iron catalyst used in the converters 4 and 7. This converts practically the final traces of the carbon monoxide to carbon dioxide. The converter 11 is cooled by water introduced by the pipe 112.

From the converter 11, the gas passes through the coil 14 of heat exchanger 1, and thence to a cooler 12 supplied with cooling water by a pipe 121. The cool gas now passes through a pipe 122 into a carbon dioxide washer, to which wash water or potash solution is supplied through a spray 131. The detoxicated gas is taken off by a pipe 132, and the wash water by a pipe 133.

The converter 4 is preferably composed of a casing containing the tubes 41 which are, for example, about 5 meters long and 15 millimeters inside diameter. The cooling water is supplied at such a rate and temperature as to maintain the reaction temperature at about 250° C., which causes a steam pressure at the cooling water outlet 44 of about 42 atmospheres. The gas leaving the second converter 7 has a carbon monoxide content of between 1% and 2%, which is substantially all removed in the final converter 11. It will be noted, however, that the great percentage of the carbon monoxide is converted in the converters 4 and 7.

If desired, the gas may be brought in contact with activated carbon before it enters the heater 1 in order to remove resin forming substances such as benzine.

The invention is particularly applicable to treatment of illuminating gases at high pressures, for example, pressures of 10 to 20 atmospheres. Such gases are of course often supplied in cylinders for the purpose of easy shipment. In such case the converters are made much smaller and less highly active catalysts are required.

It is also possible to vary the inert content of the gas and the composition thereof so as to maintain the density of the gas at any desired value. This can be accomplished, along with regulation of the carbon monoxide and hydrogen content, by the oxygen pressure gasification of solid fuel in generators, for example in the manner well known in the production of illuminating gas.

It is also possible, by utilizing oxygen pressure gasification, to reduce the formation of methane by suitable adjustment of the oxygen and steam supply so as to compensate for the reduction of the heating value of the detoxicated gas because of the formation of liquid hydrocarbons. In fact in this manner the heating value can be increased during the detoxication.

The following example will show the production of detoxicated illuminating gas according to the present invention.

*Example*

A gas produced by the oxygen pressure gasification of brown coal (lignite) at a pressure of 20 atmospheres and subsequent washing with water under pressure had the following composition:

| | Per cent |
|---|---|
| $CO_2$ | 2 |
| $C_nH_m$ | 0.6 |
| CO | 21.6 |
| $H_2$ | 56.8 |
| $CH_4$ | 17 |
| $N_2$ | 2 |

The maximum heating value of the gas was 4100 kg.-cal. per normal cubic metre. The density was 0.44 (air=1). This gas was treated in the apparatus shown in the drawing. It was heated in the heat exchanger 2 to 250° C., purified in the purifier 3, and then passed through the converters 4 and 7. The tubes of the converters 4 and 7 contained a catalyst of the following composition by weight, which has proved especially effective:

| | Per cent |
|---|---|
| Iron | 33 |
| Copper | 8 |
| Potassium carbonate | 2 |
| Manganese oxide | 6 |
| Kieselguhr | 51 |

Generally speaking the content of manganese oxide and a part of the copper (down to 1.6% Cu) may be replaced by $Al_2O_3$ and/or $ThO_2$ and the carrier mass may be higher, e. g., 61%.

This catalyst was prepared by melting crystallized iron nitrate, copper nitrate, potassium nitrate and manganese nitrate, and then stirring in kieselguhr until a doughy consistency was obtained. This doughy mass was dried, granulated and decomposed at 450° C. in a strong current of air until the nitrogen content of the mass was less than 3%. The catalyst was then reduced with hydrogen at 250° C. to 300° C.

The gas leaving the separator 8 and condenser 9, that is, after the separation of the fluid products, including for instance benzine and gas oil, has the following constitution:

| | Per cent |
|---|---|
| $CO_2$ | 13.5 |
| $C_nH_m$ | 0.9 |
| CO | 2.0 |
| $H_2$ | 52.2 |
| $CH_4$ | 28.5 |
| $N_2$ | 2.9 |

The gas of this composition was then passed to the converter 11 containing a catalyst of 33% nickel, 6% thorium oxide ($ThO_2$), 61% kieselguhr. The gas leaving this final converter 11 had the following composition:

| | Per cent |
|---|---|
| $CO_2$ | 14.0 |
| $C_nH_m$ | 0.9 |
| CO | 0.8 |
| $H_2$ | 50.5 |
| $CH_4$ | 30.8 |
| $N_2$ | 3.0 |

A portion of the inert substances, preferably the carbon dioxide, was removed in the carbon dioxide washer 13.

The resulting gas had a heating value of 4600 kg.-cal. per normal cubic meter and its density was 0.46. The hydrogen content was substantially the same as that of the original gas, so that the combustion properties of the gas were practically unchanged, and the gas corresponded to a normal standard illuminating gas. The heating value was somewhat increased. However, of course it is possible to obtain the same heating value as for normal gas by utilizing a somewhat different starting gas, e. g., by a reduction of its methane content.

The conversion of the carbon monoxide in the preceding example causes a contraction of about 30% in the amount of gas. There are obtained for each normal cubic meter of the starting gas 65 grams of liquid hydrocarbons and other organic compounds containing oxygen. A considerable part of these liquid substances is useful as fuel or the like. The higher boiling constituents thereof can be converted by pressure distillation into gasoline or fuel oil.

The value of these liquid hydrocarbons is quite great compared with the loss in the volume of the gas, since the liquid hydrocarbons cost about ten times as much as the corresponding starting gas.

While I have described herein some embodiments of my invention I wish it to be understood that I do not intend to limit myself thereby except within the scope of the appended claims.

I claim:

1. A process for the recovery and detoxication of illuminating gas containing carbon monoxide and hydrogen, which comprises passing the gas at a temperature between 150° C. and 400° C., in contact with a catalyst containing as its chief active ingredient metallic iron and capable at said temperature of causing hydrogen and carbon monoxide to react in a ratio of less than 2 volumes of hydrogen to 1 volume of carbon monoxide, and of forming by such reaction liquid hydrocarbons and organic compounds which contain oxygen, and removing at least a portion of such substances from the gas.

2. A process of detoxicating illuminating gas containing carbon monoxide and hydrogen, which comprises passing the gas at a temperature between 150° C. and 400° C., in contact with a catalyst containing as its chief active ingredients metallic iron and iron oxides capable at said temperature of causing hydrogen and carbon monoxide to react in a ratio of less than 2 volumes of hydrogen to 1 volume of carbon monoxide, and of forming by such reaction liquid hydrocarbons and organic compounds which contain oxygen, and removing at least a portion of such substances from the gas.

3. A process of detoxicating illuminating gas containing carbon monoxide and hydrogen, which comprises passing the gas at a temperature between 150° C. and 400° C., in contact with a catalyst containing as its chief active ingredients metallic iron and difficultly reducible metal compounds capable at said temperature of causing hydrogen and carbon monoxide to react in a ratio of less than 2 volumes of hydrogen to 1 volume of carbon monoxide, and of forming by such reaction liquid hydrocarbons and organic compounds which contain oxygen, and removing at least a portion of such substances from the gas.

4. A process as claimed in claim 1 in which said catalyst further contains copper.

5. A process as claimed in claim 1 in which said catalyst includes kieselguhr as a carrier.

6. In a process as claimed in claim 1, the step of contacting the resulting gas with a catalyst selected from the group of cobalt and nickel to remove carbon monoxide therefrom.

7. A process as claimed in claim 1 in which said catalyst contains an alkali metal compound.

OSKAR DORSCHNER.